United States Patent [19]
Crandall

[11] Patent Number: 5,940,230
[45] Date of Patent: Aug. 17, 1999

[54] POWER FOLDING REARVIEW MIRROR ASSEMBLY FOR AN AUTOMOTIVE VEHICLE

[75] Inventor: Robert M. Crandall, Capac, Mich.

[73] Assignee: Harman Automotive, Inc., Farmington Hills, Mich.

[21] Appl. No.: 08/823,913

[22] Filed: Mar. 25, 1997

[51] Int. Cl.⁶ .............................. G02B 5/08; G02B 7/18; A47G 1/24; A47F 7/14
[52] U.S. Cl. .......................... 359/841; 248/479; 248/900
[58] Field of Search .................... 359/841, 872, 359/877; 248/479, 549, 900

[56] References Cited

U.S. PATENT DOCUMENTS

| | | | |
|---|---|---|---|
| 4,606,619 | 8/1986 | Yamana | 248/549 |
| 4,640,590 | 2/1987 | Wunsch | 359/877 |
| 4,969,727 | 11/1990 | Harloff et al. | 359/877 |
| 5,098,058 | 3/1992 | Polzer et al. | 248/549 |
| 5,111,341 | 5/1992 | Keast | 359/841 |
| 5,124,846 | 6/1992 | Seitz et al. | 359/843 |
| 5,477,390 | 12/1995 | Boddy et al. | 359/841 |

*Primary Examiner*—Thong Nguyen
*Assistant Examiner*—Mark A. Robinson
*Attorney, Agent, or Firm*—Dykema Gossett PLLC

[57] ABSTRACT

A power folding mirror assembly has a mirror housing that defines a cavity therein. An applique is mounted proximate the mirror housing. The applique has a pivot arm extending into the mirror housing. The pivot arm has a pivot point thereon. The mirror housing is coupled to the pivot arm at the pivot point. A housing arm extends from the mirror housing. A motor mounted within the vehicle has a drive gear coupled thereto. A gear mechanism is coupled between the housing arm and the drive gear so that as the motor rotates, the pivot gear causes the mirror housing to pivot about the pivot point.

19 Claims, 3 Drawing Sheets

POWER FOLDING REARVIEW MIRROR ASSEMBLY FOR AN AUTOMOTIVE VEHICLE

BACKGROUND OF THE INVENTION

The present invention relates generally to exterior mounted rearview mirrors for motor vehicles and, more specifically, to power folding mirror assemblies.

Rearview mirrors are located on a vehicle to assist a vehicle operator to see behind and to the sides of vehicle. Exterior rearview mirrors extend from the side of the vehicle. The general construction of a mirror assembly includes a mirror housing mounted to an applique on the vehicle. The applique is a generally low profile component which is fixedly mounted to the vehicle. The mirror housing contains a mirror and its adjustment mechanism.

Mirrors on sport-utility type vehicles and other large vehicles often extend a relatively large distance with respect to the side of the vehicle. The extension of the mirror from the side of the vehicle in some instances such as when using a service window of a bank or drive-through restaurant may present obtrusive difficulties when maneuvering the vehicle. Often the vehicle must be positioned a great distance from the service window to clear the mirrors. The extended distance makes the performance of a transaction difficult.

To alleviate this difficulty some vehicle manufactures are providing folding mirrors which fold close to the vehicle for tight maneuvers. Many such mirrors are manually operated. That is, a vehicle operator must leave the vehicle to position the mirror close to the vehicle and then return to reposition the mirror.

Some vehicle manufactures have provided power folding mirrors to make retracting the mirrors easier. Such mirrors utilize a motor housed within the mirror housing to pivot the housing with respect to the applique. Several problems exist with placing the folding mechanism within the mirror. The first problem is that a significant amount of noise is generated during the folding process. The noise is magnified since the motor is partially enclosed within the mirror housing. The second problem is that a motor must be weatherproofed which adds expense to such an assembly. Third, the motor and its associated gearing take up a significant amount of space within the mirror housing adding to the bulk and heft of the mirror assembly. Consequently, a relatively small motor is employed. A smaller motor generating the same output as a larger motor is more expensive.

It would therefore be desirable to provide a power folding mirror assembly that overcomes the shortcomings of previously know folding mirrors.

SUMMARY OF THE INVENTION

It is therefore an object of the present invention to provide an improved power folding mirror assembly that is less expensive to manufacture and is less noisy than conventional power folding mirrors.

According to one aspect of the invention, a mirror assembly is disclosed that includes a mirror housing defining a cavity and an applique mounted to the vehicle. A pivot means is used for rotatably coupling the mirror housing to the applique. A motor is coupled within the vehicle and has an output shaft. A coupling means is used for coupling the motor to the housing and for rotating the mirror housing about the pivot means.

In a more specific embodiment of the invention, the applique has a pivot arm extending into the housing. The pivot arm has a pivot point thereon. The mirror housing is rotatably coupled to the pivot arm at the pivot point. A housing arm extends from the housing. A motor coupled within the vehicle has a drive gear. A gear mechanism is coupled between the housing arm and the drive gear so that as the motor rotates, the pivot gear causes the mirror housing to pivot about the pivot point.

In another aspect of the invention the motor is mounted so that if the mirror is manually adjusted the fold mechanism is not damaged. The mirror is also mounted so that if the motor gear tries to over travel the drive gear, a ratcheting effect will prevent damage. One way to mount a motor to prevent such damage is to mount the motor using a spring. The spring allows the drive gear and motor some give and to "slip" with respect to the pivot gear without causing damage to either gear.

In yet another aspect of the present invention, the mirror housing is mounted to pivot forward without damage to the mirror assembly. In this configuration, the mirror housing after forward deflection snaps back and is locked into place.

One advantage of the present invention is that the motor assembly may be placed within the vehicle in a location that is unused in most vehicles. Thus, a vehicle design does not have to be modified to incorporate the present power folding mirror of the present invention.

Another advantage of the present invention is that the motor is located in a position within the vehicle that is already weatherproof. Thus, the cost of separately weatherproofing the motor is eliminated.

BRIEF DESCRIPTION OF THE DRAWINGS

Other features and advantages of the present invention will become apparent from the following detailed description which should be read in conjunction with the drawings in which.

DETAILED DESCRIPTION OF THE PREFERRED EMBODIMENT

Figure 1:
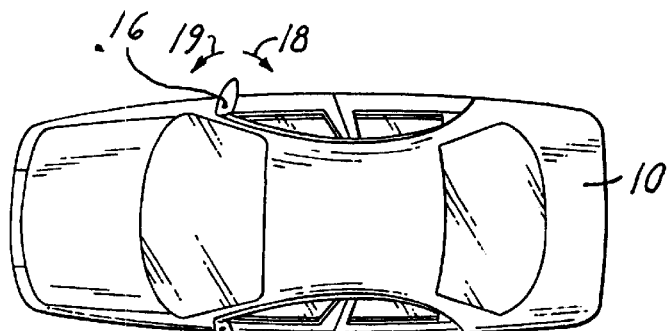
FIG. 1 is a top view of an automotive vehicle having a power folding mirror assembly according to the present invention.

Referring now to the drawings, like reference numerals are used to identify identical components in the various views. Although the invention will be illustrated in the context of a driver side mirror mounted to a door of an automotive vehicle, it will be appreciated that this invention may be used with passenger side mirrors and may be mounted on various locations on the vehicle such as a fender.

Referring now to FIG. 1, an automotive vehicle 10 has a pair of power folding mirror assemblies 12. Each mirror assembly 12 is illustrated mounted to a vehicle door 14. Each mirror assembly 12 folds with respect to vehicle 10 about an axis 16 in a direction rearward of vehicle 10 as shown by direction arrow 18. Mirror assembly 12 may break away in the forward direction as shown by arrow 19. When folded, the distance each mirror assembly 12 extends from vehicle 10 is reduced.

Figure 2:
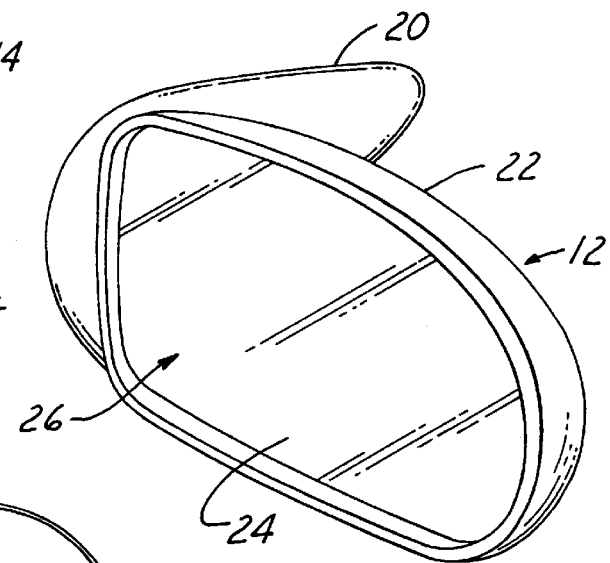
FIG. 2 is a perspective view of a mirror housing of a power folding rearview mirror.

Referring now to FIG. 2, mirror assembly 12 includes an applique 20, a mirror housing 22 and a mirror 24. Applique 20 and housing 22 are preferably formed of a polymeric material to minimize its weight. Applique 20 is fixed to vehicle 10 preferably on door 14. Housing 22 moves with respect to applique 20 during folding.

Housing 22 generally defines a cavity 26 therein. Cavity 26 encloses an electric mirror actuator 27 that is coupled to mirror 24. Electric mirror actuator 27 is used to position mirror 24 with respect to housing 22.

Figure 3:
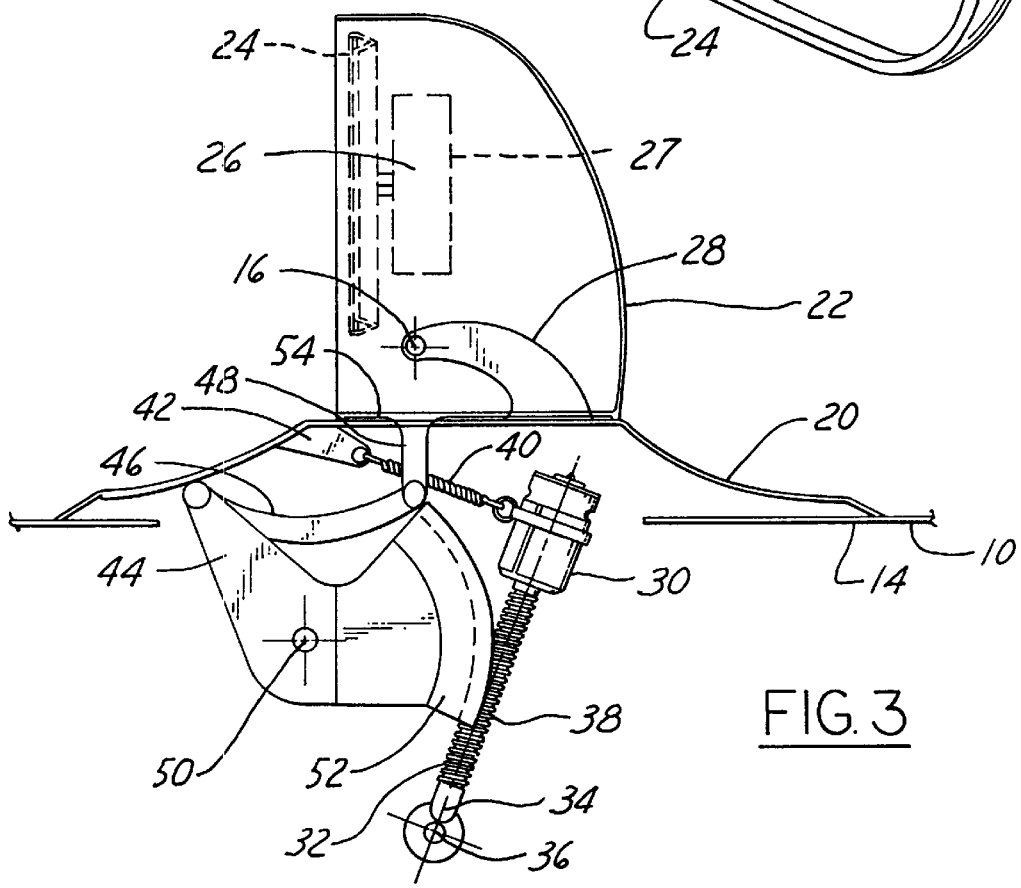
FIG. 3 is a partial cutaway top view of a power folding mirror in an unfolded position.

Referring now to FIG. 3, mirror housing 22 pivots about an axis 16. Applique 20 has a pivot means such as a pivot arm 28 that extends into cavity 26 of housing 22. To cause housing 22 to move with respect to applique 20, a motor 30 is coupled to a coupling mechanism 32. Coupling mechanism 32 moves in response to movement of motor 30. Coupling mechanism 32 may include a pivot gear 44 and a link 46.

Motor 30 is mounted within vehicle 10. Motor 30 has an output shaft 34 that is mounted at shaft mount 36 to vehicle 10. Shaft mount 36 allows output shaft 34 to rotate. Output shaft 34 has a gear 38 either coupled thereto or integrally formed therein. Gear 38, for example, may be a pinion gear.

Motor 30 is preferably coupled to applique 20 through a spring 40 at a spring mount 42. By mounting motor 30 to applique 20 with a spring 40, the position of motor 30 and output shaft 34 may move relative to coupling mechanism 32 to prevent damage during over travel and a manual override as will be described below. Shaft mount 36 allows output shaft 34 to pivot along an axis generally transverse to the rotational axis of the gear 38.

Coupling mechanism 32 has a pivot gear 44 which is mounted in the door and which is connected to a link 46. Link 46 is connected to a housing arm 48 which is pivotally fixed with the housing 22, extending from housing 22. Housing arm 48 may be integrally formed with housing 22. Pivot gear 44 pivots about a pivot gear relative axis 50 which is independent of axis 16. One end of pivot gear 44 has a segment gear 52 which is arc-shaped formed therein. Segment gear 52 engages gear 38 of output shaft 34. As output shaft 34 rotates, different points along the arc of segment gear 52 contact gear 38. The arc of segment gear 52 is preferably centered around pivot gear axis 50 so that as segment gear 52 moves pivot gear 44 rotates about pivot gear axis 50. As pivot gear 44 rotates, link 46 moves housing arm 48 so that mirror housing 22 pivots about axis 16.

To reduce weight, pivot gear 44, link 46, and housing arm 48 may all be made of a polymeric material. The gears, for example, may be made from a self lubricating polymer such as Lubriloy (TM) made by LNP Engineering Plastics located in Pennsylvania.

To assist in moving of housing 22 with respect to applique 20, a slide 54 may be coupled to applique 20 and/or housing 22. Slide 54 may be, for example, a urethane roller, a nylon-type slide. Other materials may also be used as a slide 54. Slide 54 prevents wear on the edge of housing 22.

Figure 4:
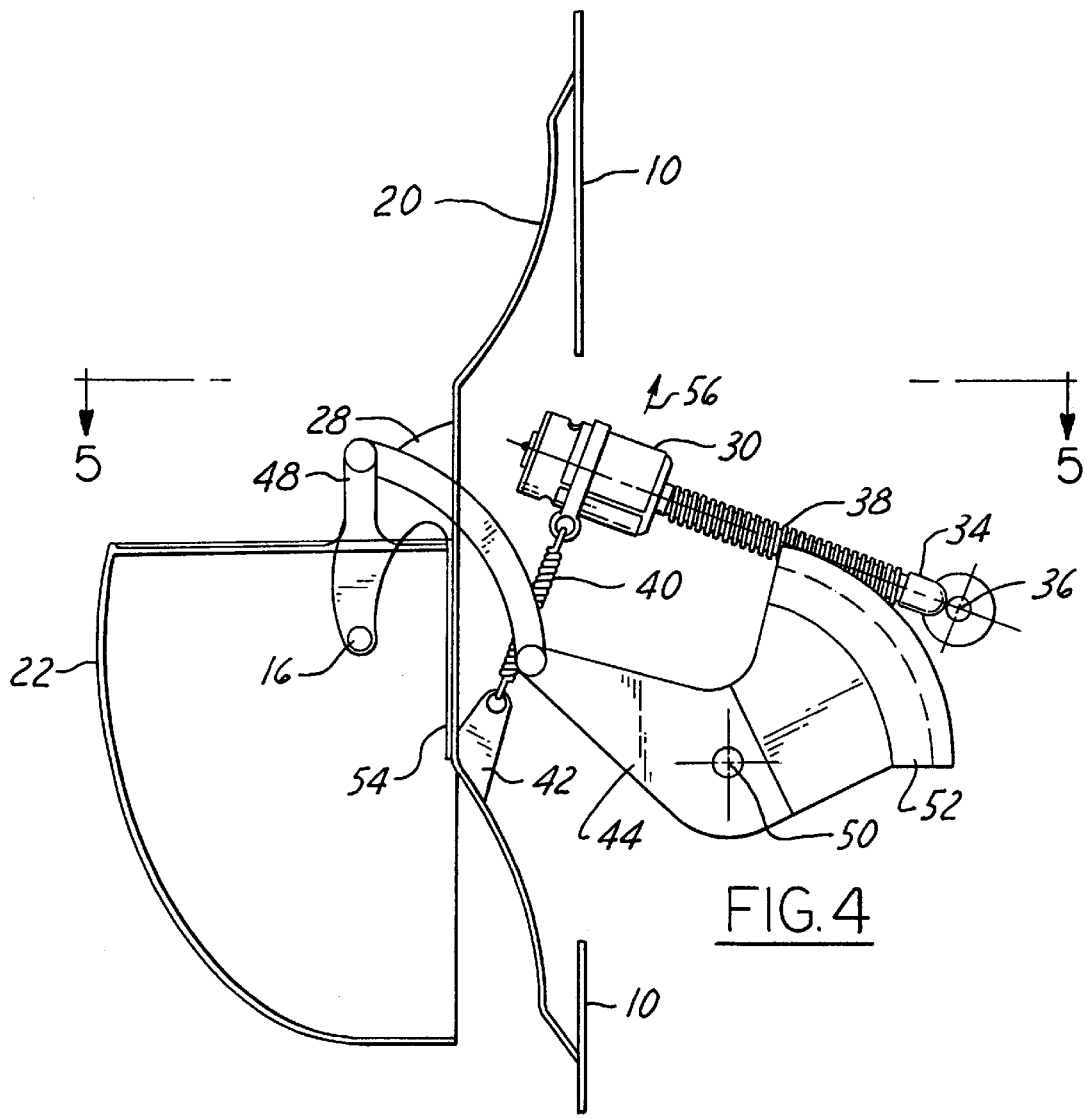
FIG. 4 is a partial cutaway top view of a power folding mirror in a folded position.

Referring now to FIG. 4, housing 22 and the power folding mechanism is shown in its folded position. Pivot gear 44 moves link 46 which in turn moves housing arm 48 about axis 16. At this position, link 46 extends partially out from applique 20. Link 46 preferably has an arc-shape to assist in moving housing arm 48 about axis 16.

Housing 22 is shown at its most folded position. If gear 38 continues to rotate motor 30 will move in an outward direction shown by arrow 56. The movement in the direction of arrow 56 will allow segment gear 52 to ratchet in place due to over travel. As motor 56 moves outward due to spring 40, segment gear 52 jumps out of engagement with gear 38 and will re-engage itself when aligned with another one of the positions on gear 38. This same type of movement takes place when housing 22 is forced to move manually. This slipping effect prevents damage to segment gear 52 and to gear 38.

One advantage of such a system is that the mechanism may accommodate a number of sizes of mirrors. Gear 38 may be made slightly larger or smaller to generate more or less torque to accommodate larger or smaller mirror assemblies.

Figure 5:
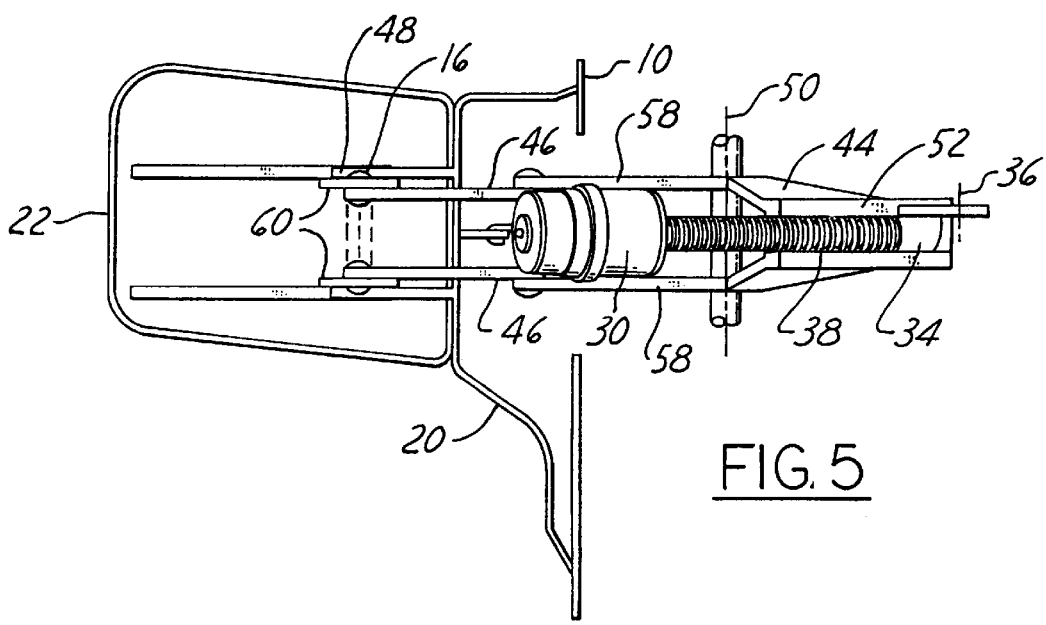
FIG. 5 is a partial cutaway view of looking into a power folding mirror in a folded position, taken generally on the line 5—5 of FIG. 4.

Referring now to FIG. 5, an end view of housing 22 with respect to the power folding mechanism is shown. Pivot gear 44 may have a pair of arms 58 used to couple to a pair of links 46. Links 46 may be coupled to a pair of housing arms 48. Housing arms 48 and links 46 may have nylon washers 60 coupled therebetween to facilitate movement between links 46 and housing arms 48.

In operation, motor 30 is operated by a switch (not shown) controlled by the vehicle operator when the mirror is desired to be folded. Motor 30 rotates the gear 38. Gear 38 engages the segment gear 52 causing pivot gear 44 to rotate about axis 50 in a clockwise direction. As segment gear 52 rotates about axis 50, link 46 moves housing arm 48 so that mirror housing 22 rotates about axis 16.

To unfold the mirror housing 22, motor 30 rotates gear 38 in the opposite direction. Gear 52 moves in the opposite direction as when folded causing pivot gear 44 to rotate in a counter clockwise direction. Link 46 is pulled into applique 20 and rotates housing 22 towards its unfolded position.

The switch may be operated such that one touch will allow the power mirror to fold or unfold into its desired position similar to that of a one touch power window. The switch located within the vehicle may be of the type where the motor will cause the housing to move only when the switch is closed similar to a conventional power window. The switch, in such a case, will have to be held until the desired position is reached.

Figure 6:
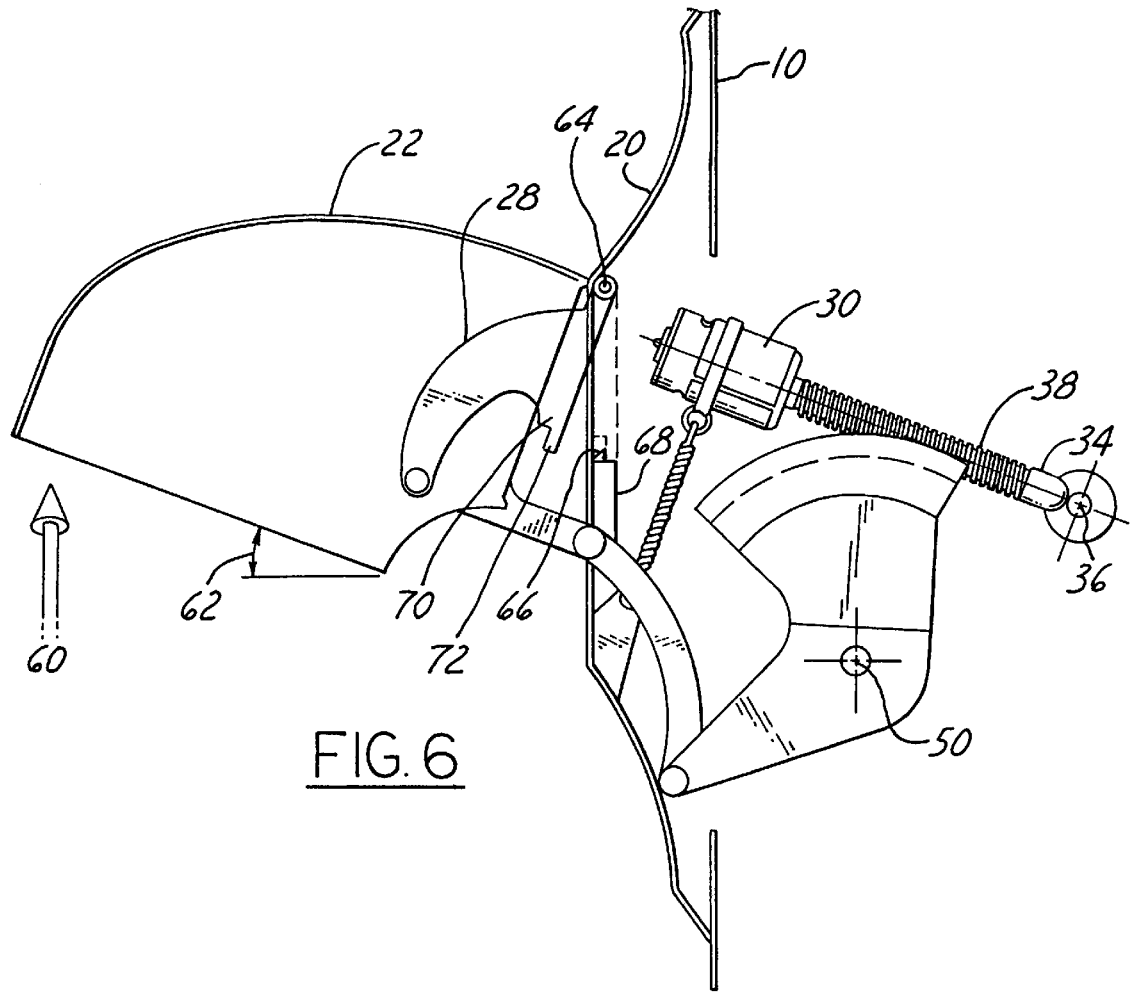
FIG. 6 is a partial cutaway top view of a power folding rearview mirror in a tilted forward position.

Referring now to FIG. 6, in some countries the mirror housing is required to pivot forward upon the application of a forward force represented by arrow 60 to housing 22. For example, some requirements specify housing 22 to pivot on angle 62 of 20°.

Housing 22 and pivot arm 28 pivot about a forward pivot point 64. As housing 22 moves forward, pivot arm 28 also moves forward. Upon release of forward force 60 housing 22 and pivot arm 28 return to their normal position represented by dashed lines.

To hold pivot arm 28 and housing 22 in its normal position a slide 66 mounted within a slide housing 68 is used. Slide housing 68 is fixedly coupled to or may be integrally formed with applique 20.

Pivot arm 28 has a base portion 70 that is coupled to forward pivot point 64. Base portion 70 has a tab 72. Slide 66 engages tab 72 to hold pivot arm 28 and housing 22 in its normal (not tilted forward) position.

Slide 66 is preferably formed of a durable flexible elastomeric material such as polyurethane. Upon the application of a forward force to mirror housing 22, slide 66 deflects to allow tab 72 to disengage from slide 66 and allow pivot arm 28 to move forward with mirror housing 22.

Figure 8:
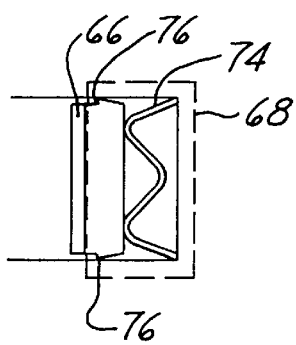
FIG. 8 is a side view of a slide in a slide housing.
Figure 7:
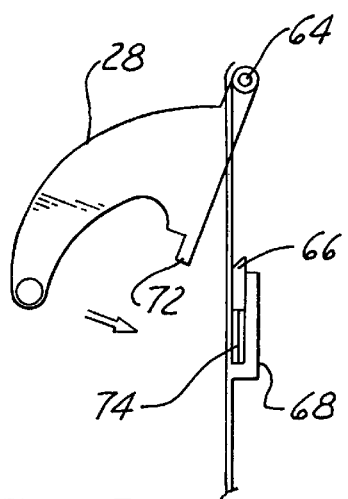
FIG. 7 is a cross-sectional view of a slide in a slide housing.

Referring now to FIGS. 7 and 8, a spring 74 is located in slide housing 68. Spring 74 may take the form of many types biasing means known in the art. As shown, spring 74 is a W-shaped piece of resilient wire which engages both housing 68 and slide 66. Spring 74 biases slide 66 out of housing 68.

When a forward force ceases and mirror housing 22 and tab 72 of pivot arm 28 are tilted forward, tab 72 moves back to reengage slide 66. Slide 66 preferably has a wedge shaped end. Tab 72 pushes against the wedge shaped end of slide 66 to urge slide 66 into housing 68 against the force of spring 74.

When tab 72 moves past slide 66, slide 66 is biased into its extended position by spring 74. As slide 66 is snapped into place, a audible clicking noise will be generated to indicate that tab 72 and thus housing 22 is properly engaged. Slide 66 has shoulders 76 to prevent slide 66 from extending more than desired from housing 68.

When the power folding (rearward) of the mirror housing is performed as described in FIGS. 1–5, tab 72 remains engaged with slide 66.

While the best mode for carrying out the present invention has been described in detail, those familiar with the art to which this invention relates will recognize various alternative designs and embodiments for practice in the invention as defined by the following claims:

What is claimed is:

1. An automotive vehicle comprising:
   an applique mounted to the vehicle;
   a mirror housing defining a cavity;
   a pivot for rotatably coupling said mirror housing to said applique;
   a motor mounted with the automotive vehicle, said motor having an output shaft with a pinion gear coupled thereon: and:
   a pivot gear coupled to said pinion gear and pivotally coupled to said mirror housing for coupling said motor to said mirror housing and rotating said mirror housing about said pivot;
   said pivot gear being pivotally coupled to said housing via a link pivotally coupled to said housing and to said pivot gear.

2. An automotive vehicle as recited in claim 1, wherein said pivot comprises a pivot arm coupled to said mirror housing, said pivot arm having a pivot point.

3. An automotive vehicle as recited in claim 1, wherein said pivot gear has an arc-shaped segment gear formed thereon.

4. An automotive vehicle as recited in claim 1, wherein said link is curved.

5. An automotive vehicle as recited in claim 1, further comprising a spring mounting said motor to the vehicle.

6. An automotive vehicle as recited in claim 1, further comprising a vehicle door, said motor mounted within said vehicle door.

7. An automotive vehicle as recited in claim 1, further comprising a forward pivot point about which said mirror housing pivots in a forward direction.

8. An automotive vehicle as recited in claim 7, further comprising a slide means coupled to said applique for releasably engaging a pivot arm upon application of a forward force applied to said housing.

9. An automotive vehicle as recited in claim 8, wherein said slide means comprises a flexible slide and a spring urging a portion of said slide out of a slide housing.

10. A mirror assembly for an automotive vehicle comprising:
    a mirror housing defining a cavity;
    an applique proximate said mirror housing, said applique having a pivot arm extending into said mirror housing; said pivot arm having a pivot point thereon,
    said mirror housing coupled to said pivot arm at said pivot point;
    a housing arm extending from said mirror housing being pivotally fixed with respect to said mirror housing;
    a motor;
    a drive gear coupled to said mirror;
    a gear mechanism coupled between said housing arm and said drive gear so that as said motor rotates, said pivot gear causes said mirror housing to pivot about the pivot point;
    said pivot arm having a base portion, said base portion and said mirror pivoting about a forward pivot point upon the application of a forward force to said mirror housing; and
    said applique having a slide coupled to said base portion for releasably engaging said base portion upon application of a forward force to said mirror housing and reengaging said base upon a release of said forward force.

11. A mirror assembly as recited in claim 10, wherein said motor is mounted within said vehicle.

12. A mirror assembly as recited in claim 10, further comprising a spring mounting said motor to said vehicle.

13. A mirror assembly as recited in claim 10, wherein said gear mechanism comprises a pivot gear coupled to said drive gear and a link coupled to said mirror housing.

14. A mirror assembly as recited in claim 13, wherein said pivot gear is rotatably coupled to said vehicle at a pivot point.

15. A mirror assembly as recited in claim 13, wherein said pivot gear comprises an arc shaped segment gear, said arc-shaped segment gear engaging said drive gear.

16. A mirror assembly as recited in claim 13, wherein said link is arc-shaped.

17. A mirror assembly as recited in claim 10, wherein said drive gear is a pinion gear.

18. A mirror assembly as recited in claim 10, further comprising a slide means coupled between said applique and said mirror housing for reducing wear between said mirror housing and said applique.

19. An automotive vehicle comprising:
    an applique mounted to the vehicle;
    a mirror housing defining a cavity;
    a pivot for rotatably coupling said mirror housing to said applique;
    a motor mounted within the automotive vehicle said motor having an output shaft with a pinion gear coupled thereon, said pinion gear having a pivotal connection with the vehicle along an axis transverse with a rotation axis of the pinion gear; and
    a pivot gear for coupling said pinion gear to said mirror housing and rotating said mirror housing about said pivot.

* * * * *